United States Patent
Lawler et al.

(10) Patent No.: US 11,834,983 B2
(45) Date of Patent: Dec. 5, 2023

(54) METHOD FOR CONTROL OF ADVANCED COMBUSTION THROUGH SPLIT DIRECT INJECTION OF HIGH HEAT OF VAPORIZATION FUEL OR WATER FUEL MIXTURES

(71) Applicant: THE RESEARCH FOUNDATION FOR THE STATE UNIVERSITY OF NEW YORK, Albany, NY (US)

(72) Inventors: Benjamin Lawler, Stony Brook, NY (US); Mozhgan Rahimi Boldaji, Stony Brook, NY (US); Brian Gainey, Stony Brook, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 0 days.

(21) Appl. No.: 17/626,222

(22) PCT Filed: Jul. 14, 2020

(86) PCT No.: PCT/US2020/041914
§ 371 (c)(1),
(2) Date: Jan. 11, 2022

(87) PCT Pub. No.: WO2021/011528
PCT Pub. Date: Jan. 21, 2021

(65) Prior Publication Data
US 2022/0316391 A1 Oct. 6, 2022

Related U.S. Application Data

(60) Provisional application No. 62/874,088, filed on Jul. 15, 2019.

(51) Int. Cl.
*F02B 47/04* (2006.01)
*F02B 7/04* (2006.01)

(52) U.S. Cl.
CPC .............. *F02B 47/04* (2013.01); *F02B 7/04* (2013.01); *F02B 2275/14* (2013.01)

(58) Field of Classification Search
CPC .. F02B 47/04; F02B 47/08; F02B 7/04; F02B 2275/14; F02M 25/0227; F02M 25/0228;
(Continued)

(56) References Cited

U.S. PATENT DOCUMENTS

| 4,372,264 A | 2/1983 | Trucco |
| 4,446,830 A | 5/1984 | Simko et al. |

(Continued)

FOREIGN PATENT DOCUMENTS

| AU | 2017203995 A1 | 7/2017 |
| CN | 108286480 A | 7/2018 |

(Continued)

OTHER PUBLICATIONS

International Search Report dated Sep. 25, 2020 issued in PCT/US2020/041914.
(Continued)

*Primary Examiner* — Hai H Huynh
(74) *Attorney, Agent, or Firm* — SCULLY SCOTT MURPHY AND PRESSER

(57) ABSTRACT

The disclosure relates to a method for controlling compression ignition combustion phasing in an internal combustion engine, the method comprising providing a high heat of vaporization fuel charge, the high heat of vaporization fuel charge having a latent heat of vaporization; and directly injecting a spray of the fuel charge into a cylinder of an internal combustion engine during the intake stroke, the internal combustion engine having a gas exchange stage and a combustion stage, the injecting from a single injector and occurring at least immediately after Top Dead Center during the gas exchange stage.

28 Claims, 7 Drawing Sheets
(6 of 7 Drawing Sheet(s) Filed in Color)

(58) Field of Classification Search
CPC ............... F02M 25/14; F02M 2200/95; F02M 2200/956; Y02T 10/30; Y02T 10/40; F02D 19/0652; F02D 19/12; F02D 41/0025; F02D 41/40
USPC ........ 123/1 A, 25 A, 25 C, 198 A, 299, 300, 123/305
See application file for complete search history.

(56) References Cited

U.S. PATENT DOCUMENTS

| | | | |
|---|---|---|---|
| 4,520,765 A | 6/1985 | Gerace | |
| 4,552,106 A | 11/1985 | Spence | |
| 4,635,590 A | 1/1987 | Gerace | |
| 4,898,126 A | 2/1990 | Merritt | |
| 5,467,757 A | 11/1995 | Yanagihara et al. | |
| 5,743,243 A | 4/1998 | Yanagihara | |
| 5,967,113 A | 10/1999 | Kaneko et al. | |
| 5,975,046 A | 11/1999 | Kaneko et al. | |
| 6,044,642 A | 4/2000 | Nishimura et al. | |
| 6,062,195 A | 5/2000 | Tanaka et al. | |
| 6,276,334 B1 | 8/2001 | Flynn et al. | |
| 6,286,482 B1 | 9/2001 | Flynn et al. | |
| 6,330,796 B1 | 12/2001 | Nishimura et al. | |
| 6,345,499 B1 | 2/2002 | Nishimura et al. | |
| 6,497,213 B2 | 12/2002 | Yoshizawa et al. | |
| 6,532,933 B1 | 3/2003 | Tanaka et al. | |
| 6,622,690 B2 | 9/2003 | Ando et al. | |
| 6,636,797 B2 | 10/2003 | Yoshizawa et al. | |
| 6,651,677 B2 | 11/2003 | Sukegawa et al. | |
| 6,748,919 B2 | 6/2004 | Abo et al. | |
| 6,789,514 B2 | 9/2004 | Suh et al. | |
| 6,951,211 B2 | 10/2005 | Bryant | |
| 6,964,256 B2 | 11/2005 | Kataoka et al. | |
| 6,990,949 B2 | 1/2006 | Kataoka et al. | |
| 7,004,115 B2 | 2/2006 | Patton | |
| 7,021,277 B2 | 4/2006 | Kuo et al. | |
| 7,069,902 B2 | 7/2006 | Sasaki et al. | |
| 7,210,449 B2 | 5/2007 | Beer et al. | |
| 7,234,440 B2 | 6/2007 | Hilditch | |
| 7,270,108 B2 | 9/2007 | Lemke | |
| 7,472,016 B2 | 12/2008 | Takeyama et al. | |
| 7,624,709 B2 | 12/2009 | Cao | |
| 7,793,638 B2 | 9/2010 | Sturman | |
| 7,954,472 B1 | 6/2011 | Sturman | |
| 8,165,779 B2 | 4/2012 | Ostberg et al. | |
| 8,166,959 B2 | 5/2012 | Yi et al. | |
| 8,176,888 B2 | 5/2012 | Reiche et al. | |
| 8,275,538 B2 | 9/2012 | Surnilla et al. | |
| 8,417,437 B2 | 4/2013 | Yamashita et al. | |
| 8,550,042 B2 | 10/2013 | Taylor | |
| 8,596,242 B2 | 12/2013 | Nada | |
| 8,935,996 B2 | 1/2015 | Mulye | |
| 8,973,539 B2 | 3/2015 | Taylor | |
| 9,151,241 B2 | 10/2015 | Gehrke et al. | |
| 9,255,530 B2 | 2/2016 | Breuer et al. | |
| 9,297,329 B2 | 3/2016 | Surnilla et al. | |
| 9,303,577 B2 | 4/2016 | Surnilla et al. | |
| 9,382,856 B2 | 7/2016 | Kuriyama et al. | |
| 9,382,857 B2 | 7/2016 | Glugla et al. | |
| 9,399,968 B2 | 7/2016 | Glugla et al. | |
| 9,435,287 B2 | 9/2016 | Surnilla et al. | |
| 9,488,093 B2 | 11/2016 | Ruhland et al. | |
| 9,534,567 B2 | 1/2017 | Ulrey et al. | |
| 9,611,783 B2 | 4/2017 | Murtha | |
| 9,650,984 B2 | 5/2017 | Nagatsu et al. | |
| 9,863,350 B2 | 1/2018 | Nakamoto et al. | |
| 10,001,090 B1 | 6/2018 | Lawler et al. | |
| 10,047,693 B2 | 8/2018 | Imaoka et al. | |
| 10,066,574 B2 | 9/2018 | Ochi et al. | |
| 10,100,767 B2 | 10/2018 | Liu et al. | |
| 10,221,793 B2 | 3/2019 | Nogawa et al. | |
| 10,337,446 B2 | 7/2019 | Kumagae | |
| 10,385,798 B2 | 8/2019 | Ochi et al. | |
| 10,400,706 B2 | 9/2019 | Ochi | |
| 10,487,720 B2 | 11/2019 | Inoue et al. | |
| 10,550,783 B2 | 2/2020 | Coulson et al. | |
| 10,557,440 B2 | 2/2020 | Atkins | |
| 10,697,391 B2 | 6/2020 | Inoue et al. | |
| 10,914,247 B2 | 2/2021 | Inoue et al. | |
| 2001/0045201 A1 | 11/2001 | Yoshizawa et al. | |
| 2001/0056322 A1 | 12/2001 | Yoshizawa et al. | |
| 2002/0078907 A1 | 6/2002 | Patton | |
| 2003/0230276 A1 | 12/2003 | Kataoka et al. | |
| 2004/0103875 A1 | 6/2004 | Simon et al. | |
| 2006/0278196 A1 | 12/2006 | Beer et al. | |
| 2007/0227492 A1 | 10/2007 | Cheiky | |
| 2008/0060627 A1 | 3/2008 | Bromberg et al. | |
| 2008/0264393 A1 | 10/2008 | Sturman | |
| 2009/0071440 A1 | 3/2009 | Ashizawa | |
| 2009/0093950 A1 | 4/2009 | Yi et al. | |
| 2009/0164100 A1 | 6/2009 | Ostberg et al. | |
| 2011/0265758 A1 | 11/2011 | Glugla et al. | |
| 2013/0081592 A1 | 4/2013 | De Boer et al. | |
| 2013/0312708 A1 | 11/2013 | Kuriyama et al. | |
| 2014/0060466 A1 | 3/2014 | Taylor | |
| 2014/0299105 A1 | 10/2014 | Hou | |
| 2015/0240737 A1 | 8/2015 | Surnilla et al. | |
| 2017/0022923 A1 | 1/2017 | Fujimoto et al. | |
| 2018/0306106 A1 | 10/2018 | Glugla | |
| 2019/0153973 A1 | 5/2019 | Toda et al. | |

FOREIGN PATENT DOCUMENTS

| | | |
|---|---|---|
| DE | 2703316 A1 | 8/1978 |
| DE | 102011012095 B4 | 7/2015 |
| EP | 1348858 A1 | 10/2003 |
| EP | 1450027 A2 | 8/2004 |
| EP | 1567760 B1 | 6/2006 |
| EP | 1941143 A1 | 7/2008 |
| EP | 1688601 B1 | 3/2011 |
| EP | 1840359 B1 | 11/2011 |
| EP | 2392808 A1 | 12/2011 |
| EP | 1134400 B1 | 1/2012 |
| EP | 2415995 B1 | 7/2016 |
| EP | 3421764 B1 | 4/2020 |
| EP | 3502448 B1 | 11/2020 |
| JP | 2668680 B2 | 10/1997 |
| JP | H10252608 A | 9/1998 |
| JP | H1182029 A | 3/1999 |
| JP | 2000199440 A | 7/2000 |
| JP | 2000282902 A | 10/2000 |
| JP | 2000297681 A | 10/2000 |
| JP | 3175611 B2 | 6/2001 |
| JP | 2001159349 A | 6/2001 |
| JP | 2001303956 A | 10/2001 |
| JP | 3280015 B2 | 4/2002 |
| JP | 2003027977 A | 1/2003 |
| JP | 2003214235 A | 7/2003 |
| JP | 2003222042 A | 8/2003 |
| JP | 2003286885 A | 10/2003 |
| JP | 2003286886 A | 10/2003 |
| JP | 2005180207 A | 7/2005 |
| JP | 2005180208 A | 7/2005 |
| JP | 2006194098 A | 7/2006 |
| JP | 3890449 B2 | 3/2007 |
| JP | 2007332815 A | 12/2007 |
| JP | 4082329 B2 | 4/2008 |
| JP | 4117799 B2 | 7/2008 |
| JP | 2009097470 A | 5/2009 |
| JP | 4297288 B2 | 7/2009 |
| JP | 2009174344 A | 8/2009 |
| JP | 2009174345 A | 8/2009 |
| JP | 4415840 B2 | 2/2010 |
| JP | 2011132920 A | 7/2011 |
| JP | 2012207631 A2 | 10/2012 |
| JP | 5071718 B2 | 11/2012 |
| JP | 5561226 B2 | 7/2014 |
| JP | 2015096727 A | 5/2015 |
| JP | 2016089747 A | 5/2016 |
| JP | 2016098794 A | 5/2016 |
| JP | 2016200080 A | 12/2016 |
| KR | 20080099786 A | 11/2008 |
| KR | 20110064724 A | 6/2011 |
| KR | 101733730 B1 | 5/2017 |

(56) References Cited

FOREIGN PATENT DOCUMENTS

| | | | |
|---|---|---|---|
| KR | 101973116 B1 | 4/2019 | |
| KR | 20210005520 A | 1/2021 | |
| RU | 2579308 C1 | 4/2016 | |
| WO | 1984002744 A1 | 7/1984 | |
| WO | 1986004111 A1 | 7/1986 | |
| WO | 2005095768 A1 | 10/2005 | |
| WO | 2012082682 A2 | 6/2012 | |
| WO | 2013054434 A1 | 4/2013 | |
| WO | 2016021452 A1 | 2/2016 | |
| WO | 2016062554 A1 | 4/2016 | |
| WO | 2017093061 A1 | 6/2017 | |
| WO | 2020232287 A1 | 11/2020 | |
| WO | 2021011528 A1 | 1/2021 | |

OTHER PUBLICATIONS

Gainey, B., et al., "TSCI with Wet Ethanol: An Investigation of the Effects of Injection Strategy on a Diesel Engine Architecture", SAE Technical Paper 2019-01-1146, Apr. 2019, 16 pages.

Gainey, B., et al., "HCCI with Wet Ethanol: Investigating the Charge Cooling Effect of a High Latent Heat of Vaporization Fuel in LTC", SAE Technical Paper 2019-24-0024, Sep. 2019, 12 pages.

Gainey, B., et al., "Tailoring thermal stratification to enable high load low temperature combustion with wet ethanol on a gasoline engine architecture", International J of Engine Research, Jun. 2020, 12 pages.

Gainey, B., et al., "A split injection of wet ethanol to enable thermally stratified compression ignition", International J of Engine Research, Oct. 2018, 13 pages.

Gainey, B., et al., "Assessing the impact of injector included angle and piston geometry on thermally stratified compression ignition with wet ethanol", Applied Energy, Jan. 2020, 9 pages.

Gainey, B., et al., "The role of alcohol biofuels in advanced combustion: An analysis", Fuel, Aug. 2020, 11 pages.

Gainey, B., et al., "On the Effects of Injection Strategy, Exhaust Gas Recirculation, and Intake Boost on TSCI With Wet Ethanol", Journal of Engineering for Gas Turbines and Power, Sep. 2020, pp. 091013-1 to 091013-9, vol. 142.

Boldaji, M. R., et al., "Investigating the effect of spray included angle on thermally stratified compression ignition with wet ethanol using computational fluid dynamics", Applied Thermal Engineering, Jan. 2020, 12 pages.

Wu, Y.-Y., et al., "Combustion Analysis of Homogeneous Charge Compression Ignition in a Motorcycle Engine Using a Dual-Fuel with Exhaust Gas Recirculation", Energies Mar. 2019, 12, 847, 21 pages.

Lif, A., et al., "Reduction of Soot Emissions from a Direct Injection Diesel Engine using Water-in-Diesel Emulsion and Microemulsion Fuels", General Emissions, 2007 World Congress, Apr. 16-19, 2007, , 12 pages, Detroit, Michigan.

Boldaji, M. R., et al., "Thermally stratified compression ignition enabled by wet ethanol with a split injection strategy: A CFD simulation study", Applied Energy, Nov. 2018, pp. 813-826.

Yang, F. et al., "In-cycle diesel low temperature combustion control based on SOC detection", Applied Energy Sep. 2014, 136, pp. 77-88.

Krisman, A., et al., "On the potential of ethanol fuel stratification to extend the high load limit in stratified-charge compression-ignition engines", Fuel 99, Apr. 2012, pp. 45-54.

METHOD FOR CONTROL OF ADVANCED COMBUSTION THROUGH SPLIT DIRECT INJECTION OF HIGH HEAT OF VAPORIZATION FUEL OR WATER FUEL MIXTURES

PRIORITY

This application claims priority under 35 U.S.C. § 119 to provisional application U.S. Ser. No. 62/874,088 filed on Jul. 15, 2019, the entire contents of which are incorporated herein by reference.

FIELD

The disclosure pertains to compression ignition and control of same in internal combustion engines.

BACKGROUND

Current transportation technologies, including electric vehicles, consume a very large amount of fossil fuels and produce a significant amount of $CO_2$ emissions which contribute to global climate change. For these reasons, there is a great need for a new technology in the transportation market that can significantly reduce energy consumption and pollutant emissions.

Various known advanced combustion modes, for example, Low Temperature Combustion (LTC), are capable of high efficiency operation with ultra-low levels of pollutant emissions. However, these have poor control over the combustion process, which result in a relatively narrow operating range. Another mode, called Thermally Stratified Compression Ignition (TSCI), can provide cycle-to-cycle control over advanced combustion such that high efficiency and low emissions operation is achievable over a broad operating range. This known mode of TSCI uses direct water injection using a separate water injector, which separate injector in addition to complicating engine hardware, could not be directly employed in production hardware for modern gasoline or diesel engines without requiring modifications to the engine architecture.

There is thus a need for an advanced combustion method that provides cycle-to-cycle control over the rate of combustion and over the start of combustion, independently; and that achieves high efficiencies with near-zero levels of soot, NOx, and other harmful pollutant emissions; and that is employable on production hardware without requiring any changes to the architecture of modern production diesel or gasoline engines.

SUMMARY

In one aspect, the disclosure is directed to a method for controlling compression ignition combustion phasing in an internal combustion engine, the method comprising providing a high heat of vaporization fuel charge, the fuel charge having a latent heat of vaporization of between about 600 to about 1800 kJ/kg; and directly injecting a spray of the high heat of vaporization fuel charge into a cylinder of an internal combustion engine during the intake stroke, the internal combustion engine having a gas exchange stage and a combustion stage, the injecting from a single injector and occurring at least immediately after Top Dead Center (TDC) during the gas exchange stage. In other aspects, a split injection strategy wherein a first portion of the fuel charge, e.g. a water-ethanol mixture, is direct injected during the intake stroke e.g. on a production engine, and a second portion of the fuel charge is direct injected during the compression stroke. In another aspect, injection timing and amount of fuel charge direct injected during the compression stroke is used to control the rate of combustion.

In another embodiment, the method disclosed enables the injection timing of the intake stroke injection to be used as independent control over the start of combustion. In one aspect, the fraction of fuel that evaporates off of the combustion chamber walls (e.g., the cylinder liner, piston, and head) versus the fraction of fuel that evaporates in the air in the cylinder is thereby controlled. As the directly injected liquid evaporates, it absorbs heat in the phase change to the gaseous state. For every injection event, a certain fraction of the injected liquid evaporates in the air in the cylinder and a certain fraction evaporates off of the cylinder walls and other component parts. When the evaporation occurs in the cylinder air, it absorbs heat from the incoming air, which decreases the air temperature in the cylinder; when the evaporation occurs on the combustion chamber walls, heat is absorbed from the walls, which have a substantially higher specific heat, which evaporation circumstance does not change the temperature significantly. By controlling the injection timing, the fraction that evaporates in the air versus the walls can be varied, and therefore enabling control of the gas temperature in the cylinder on a cycle-to-cycle basis. And by controlling the gas temperature in the cylinder, the start of combustion can be controlled on a cycle-to-cycle basis. This effect can be varied by changing the injector included spray angle for the single direct injection.

The disclosure further provides a method for achieving high engine efficiencies with near-zero levels of soot, NOx, and other harmful pollutant emissions, which advantages can be implemented on production hardware without requiring any changes to the architecture of modern production diesel or gasoline engines. Finally, when the fuel charge comprises wet ethanol (i.e., a mixture of water and ethanol) as the high heat of vaporization water-fuel mixture, a domestically mass-produced biofuel can be employed by leaving the water content in the fermented ethanol, thereby saving a significant amount of energy otherwise required to produce such fuel.

BRIEF DESCRIPTION OF THE DRAWINGS

The patent or application file contains at least one drawing executed in color. Copies of this paper or patent application publication with color drawing(s) will be provided by the Office upon request and payment of the necessary fee.

DETAILED DESCRIPTION

Figure 1:
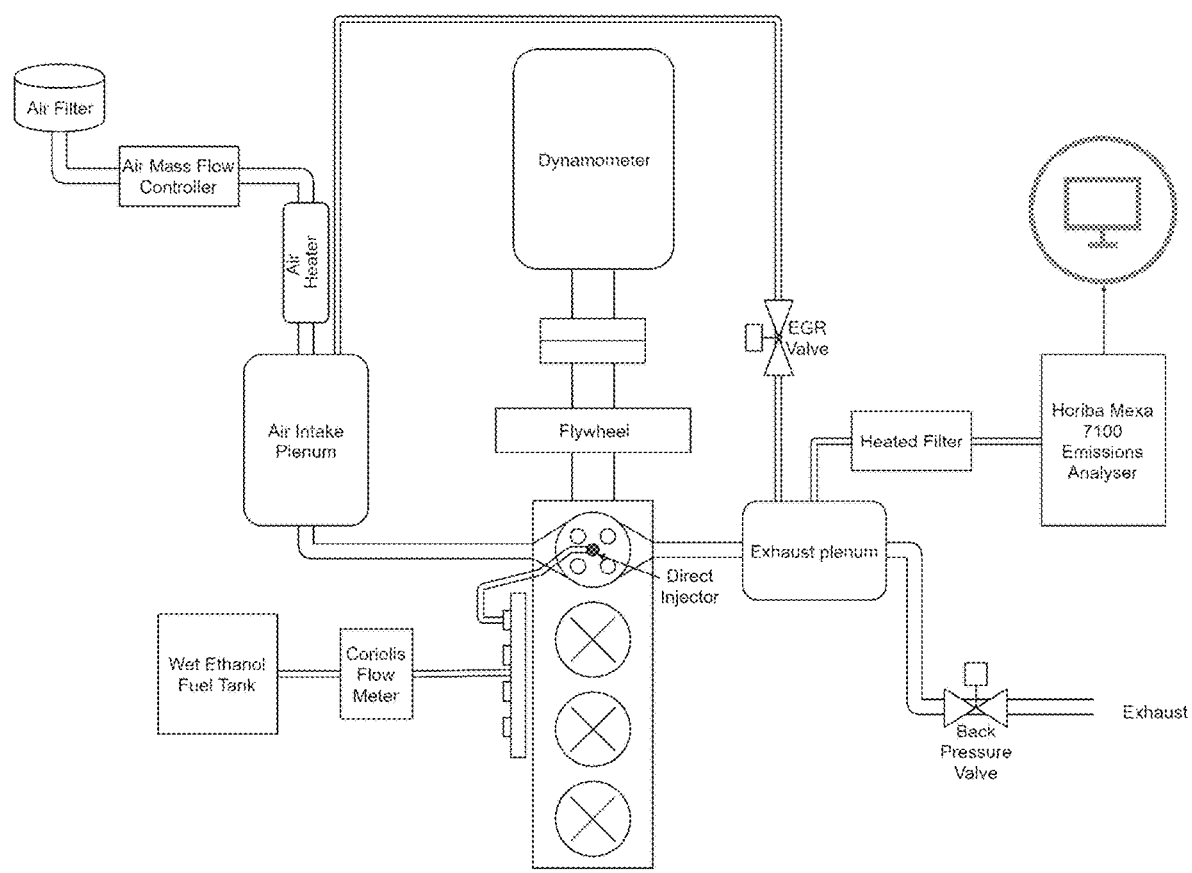
FIG. 1 is a schematic of the experimental test cell employed in the Example.

The following detailed description of embodiments of the disclosure are made in reference to the accompanying figures. Explanation about related functions or constructions known in the art are omitted for the sake of clearness in understanding the concept of the invention to avoid obscuring the invention with unnecessary detail. Embodiments of the disclosure described herein provide.

Embodiments of the invention described herein provide a method for control of advanced combustion through a split direct injection of a high heat of vaporization fuel or water-fuel mixtures. In one embodiment, the method provides a new advanced combustion mode of autoignition through compression ignition enabled by water-fuel mixtures. By using water-fuel mixtures, with a specific split injection strategy, this new advanced combustion mode can be realized with cycle-to-cycle control over the start and rate of combustion. The combustion strategy offers significantly lower engine-out emissions and simultaneously higher efficiencies than conventional combustion modes like spark ignition or diesel combustion. The method provides: 1) at least one injection event during the intake stroke where the timing of the injection event is varied to control the start of combustion; 2) at least one injection event during the compression stroke where the timing and mass fraction of fuel are varied to control the rate of combustion; and 3) multiple injection events during either the intake stroke or the compression stroke to improve the combustion efficiency and reduce the unburned hydrocarbon emissions. In one practice, the method disclosed establish that delivering the high heat of vaporization fuel charge in multiple, shorter injections where each injection contains a small amount of fuel can increase the combustion efficiency and reduce the unburned hydrocarbon emissions, especially for the compression stroke injection process.

In one embodiment, the disclosure provides a method for controlling compression ignition combustion phasing in an internal combustion engine. In one practice, the internal combustion engine comprises a four-stroke engine as known and commercially available in the art, which comprises, without limitation, a reciprocating piston connected to a crankshaft and configured to travel up and down in a cylinder, the piston having a piston head or crown, with the cylinder comprising internal walls defining the cylinder cavity, an intake valve, an outlet valve, and a liner. Operatively and as used herein, the four strokes include 1) intake (otherwise known as induction or suction), 2) compression, 3) combustion (otherwise known as power or ignition), and 4) exhaust (otherwise known as outlet). Top Dead Center is the position of the piston farthest from the crankshaft and occurs between the exhaust and intake stroke (known herein as the "gas exchange stage") and at the combustion stroke (known herein as the "combustion stage").

A high heat of vaporization fuel charge having a latent heat of vaporization of between about 600 to about 1800 kJ/kg is provided. In various non-limiting practices, the latent heat of vaporization is preferably between about 900 to about 1500 kJ/kg; between about 1000 to about 1200 kJ/kg; and between about 1100 to about 1150 kJ/kg. The fuel charge can be comprised of a single component or a mixture of components, for example, a mixture of one or more alcohols and water. Without limitation serviceable alcohols include those miscible in water and which meet the aforementioned latent heat of vaporization parameters; such alcohols include, without limitation, $C_1$-$C_6$ alkanols, including linear and all branched configurations, e.g. methanol, ethanol, propanol, isopropanol, n-butanol, sec-butanol, isobutanol, tert-butanol, and the like. In one practice, the alcohol comprises one or more $C_1$-$C_4$ alkanols. Without limitation, when the fuel charge is a mixture of such alcohol and water, the mixture comprises about 5% to about 40% water; and about 95% to about 60% alcohol, by mass. In one embodiment, the fuel charge comprises a mixture of water and ethanol, e.g. about 80% ethanol and about 20% water, by mass, herein referred to as WE80.

The fuel charge is directly injected into the cylinder (for multi-cylinder engines, each cylinder is operated as herein described) as a spray using a single injector, thus avoiding the need for additional injectors and related hardware and software. Suitable injectors for this purpose including those known in the art that the spray as plumes, the angle between the spray plumes referred to herein as an injector included angle. In non-limiting practices, the injector has an injector included angle of between about 150° to about 30°, including e.g. an injector included angle of between about 118° to about 60°, such as about 90°.

The high heat of vaporization fuel charge is injected (in whole or in part as hereinafter discussed), into the cylinder during the intake stroke, the injection occurring at least immediately after Top Dead Center (TDC) during the gas exchange stage. In one non-limiting practices, the direct injection occurs from between about at least immediately after TDC during the gas exchange stage to about −330 degrees after TDC during the combustion stage; in another such practice, direct injection occurs from between about −330 degrees after TDC during the combustion stage to about −240 degrees after TDC during the combustion stage. As understood to the artisan, the phrases using terminology such as −330 degrees after TDC during the combustion stage is also understood to equate with 330 degrees before TDS during the combustion stage. In one embodiment, the step of directly injecting the spray can comprise multiple spray injections.

In another practice, a split injection protocol is employed as a method for operating a compression ignition internal combustion. A first portion of a high heat of vaporization fuel charge as described herein is directly injected into a cylinder of an internal combustion engine during the intake stroke, the injecting coming from a single injector and occurring at least immediately after Top Dead Center (TDC) during the gas exchange stage; and a second portion of the same high heat of vaporization fuel charge is directly injected into the cylinder using the same injector during the compression stroke. In one embodiment, the first portion comprises between about 70% to about 90%, by mass, of the fuel charge; and the second portion comprises between about 10% to about 30%, by mass, of the fuel charge. In one particular practice, the fuel charge comprises a mixture of water and ethanol, e.g. the fuel charge comprises about 80% ethanol and about 20% water, by mass (WE80), and the first portion comprises about 70% of the fuel charge, by mass; and the second portion comprises about 30% of the fuel charge, by mass.

The step of directly injecting the first portion and/or the second portion can comprises multiple spray injections during the intake stroke.

In yet another aspect, the disclosure provides a method of compression ignition in an internal combustion engine which comprises comprising a step of directly injecting a spray of the high heat of vaporization fuel charge described herein from a single injector into a cylinder of an internal combustion engine during the intake stroke, wherein the injecting step comprises multiple injections and a fraction of each injection evaporates in the air of the cylinder; that is, a fraction of each injection evaporates not from the available surfaces of the cylinder and the component pieces and parts therein, but instead evaporates within the air in the volume of the cylinder defined by the internal cylinder walls, whereas the remainder of that fraction evaporates from the available surfaces, such as the piston crown and other combustion chamber surfaces. In one embodiment, the fraction that evaporates in the air of the cylinder is between about 20% to about 95%; in another embodiment, the fraction that evaporates in the air of the cylinder is between about 30% to about 90%; in yet another embodiment, the fraction that evaporates in the air of the cylinder is between about 40% to about 85%; in another embodiment, the fraction that evaporates in the air of the cylinder is between about 15% to about 95%; in still another embodiment, the fraction that evaporates in the air of the cylinder is between about 5% to about 99%. In one aspect, the injection timing during the intake stroke determines what fraction evaporates in air versus what fraction evaporates on the on cylinder walls. In one practice in this regard, the direct injection from the single injector occur between about −350 degrees after Top Dead Center (TDC) during combustion stage to about −180 degrees after TDC during the combustion stage. In yet another practice, the direct injections from the single injector occur about −330 degrees after Top Dead Center (TDC) during combustion stage to about −240 degrees after TDC during the combustion stage.

The disclosure further relates to a method of controlling the rate of combustion in an advanced compression ignition combustion process of an internal combustion engine comprising providing a high heat of vaporization fuel charge as herein described; and directly injecting a spray of the high heat of vaporization fuel charge into a cylinder of an internal combustion engine during the compression stroke, the injecting from a single injector and occurring between about −140 degrees after Top Dead Center (TDC) during combustion stage to about −30 degrees after TDC during the combustion stage. In another practice, the injecting from a single injector and occurring between about −100 degrees after Top Dead Center (TDC) during combustion stage to about −50 degrees after TDC during the combustion stage.

In one aspect, the methods disclosed herein apply to after engine start.

The following example is illustrative of the disclosure and not limiting to same.

EXAMPLE

Experimental Set-Up

Experiments were conducted fully instrumented single cylinder research engine. The engine consisted of a 4-cylinder production, diesel 1.7 L General Motors/Isuzu engine head, with one cylinder mounted to a Ricardo Hydra engine block and the other three cylinders deactivated. A custom, wide, shallow-bowl piston is used. This contrasts the standard, diesel-style re-entrant bowl used in production, which is not ideally suited for a homogeneous, low temperature combustion mode due to its' large squish region and high surface area, which both contribute to higher heat transfer losses unnecessarily. The production camshafts are used unmodified and provide 12 degrees of positive valve overlap. The engine geometry and valve timings are shown in Table 1.

A diesel common rail was used and pressurized by a Bosch CP3 pump. Two production Bosch solenoid-style diesel injectors were used in this work: DLLA150P (150° included angle) and DLLA60P (60° included angle). Custom intake and exhaust manifolds were used, each connected to a custom-made plenum. Infineum R655 lubricity additive was added to the wet ethanol (<500 ppm) to lubricate the injection system since the injection system was normally lubricated with the diesel fuel being injected. The wet ethanol was tested in HCCI combustion with and without the lubricity additive and it was found that the lubricity additive did not have an effect on combustion (i.e., there is no effect of the lubricity additive on the reactivity of the fuel mixture).

TABLE 1

Engine geometry and valve timings.

| Engine | [cc] | 421.5 |
|---|---|---|
| Compression | [−] | 16.0 |
| Stroke | [mm] | 86 |
| Bore | [mm] | 79 |
| Connecting Rod | [mm] | 160 |
| Engine Speed | [RPM] | 1200 |
| IVO | [deg bTDC] | 366 |
| IVC | [deg bTDC] | 146 |
| EVO | [deg aTDC] | 122 |
| EVC | [deg aTDC] | 366 |

A custom-made LabView program was built to serve as both a data acquisition system and an engine control unit. As a data acquisition system, all high- and low-speed measurements are taken, and real-time combustion analysis is computed. As an engine control unit, the LabView code provides direct control over the injection pressure and timing, among other things. In the following experiments, the fuel injection pressure was maintained at 500 bar. The injection timing was varied while the injection duration was adjusted at each injection timing to maintain a constant fuel flowrate.

Crank angle measurements, in increments of 0.1°, were provided by a Kistler encoder coupled to a pulse multiplier. Four high-speed Kistler pressure transducers (in-cylinder, intake, exhaust, and fuel rail) were read at each crank angle increment. Fuel flow was measured with a Coriolis flow meter. A Horiba MEXA-7100DEGR motor exhaust gas analyzer provided $CO_2$, $O_2$, CO, $NO_X$, and unburned hydrocarbon (uHC) measurements from the exhaust gas. All engine tests were conducted on an active GE dynamometer at 1200 RPM. For each case studied, 300 consecutive cycles were saved and ensemble-averaged. A custom MATLAB code then processed the ensemble-average data, and outputted the results from combustion analysis. The heat release analysis and uncertainty analysis were performed by the custom MATLAB code follow the guide outlined in Gainey, B., Longtin, J. P., & Lawler, B. (2019). A Guide to Uncertainty Quantification for Experimental Engine Research and Heat Release Analysis. *SAE International Journal of Engines*, 12(5), 509+. The experimental test cell is shown in FIG. 1. All instrument ranges and uncertainties are shown in Table 2.

TABLE 2

Model, range, and instrument uncertainty of instruments used.

| Model | Used For | Range | Uncertainty |
|---|---|---|---|
| Alicat MCRWH-1000 | Air Flow Control and Measurement | 0-1000 SLPM | ±(0.4% of reading + 2) |
| Micrometer CMFS007 | Fuel Flow Rate | 0-11.36 g/s | ±0.05% of reading |
| K-type Thermocouple | Temperature | 75-1200 K | ±0.4% of reading |
| Ohaus CL 2000 | Blending Fuel | 0-2000 g | ±1.0 g |
| Kistler 6041A | Cylinder Pressure | 0-250 bar | ±1.25 bar |
| Kistler 4011A | Intake Pressure | 0-5 bar | ±0.025 bar |
| Kistler 4049B |  | 0-5 bar | ±0.0.015 bar |
| Horiba MEXA 7100 uHC | uHC Emissions Analyzer | 0-10000 ppm | ±100 ppm |
| Horiba MEXA 7100 CO | CO Emissions Analyzer | 0-5000 ppm | ±50 ppm |
| Horiba MEXA 7100 NO$_x$ | NO$_x$ Emissions Analyzer | 0-200 ppm | ±2 ppm |
| Horiba MEXA 7100 O$_2$ | O$_2$ Emissions Analyzer | 0-18% | ±0.18% |
| Horiba MEXA 7100 CO$_2$ | CO$_2$ Emissions Analyzer | 0-5% | ±0.05% |

Results:

Cooling Potential

Figure 2:
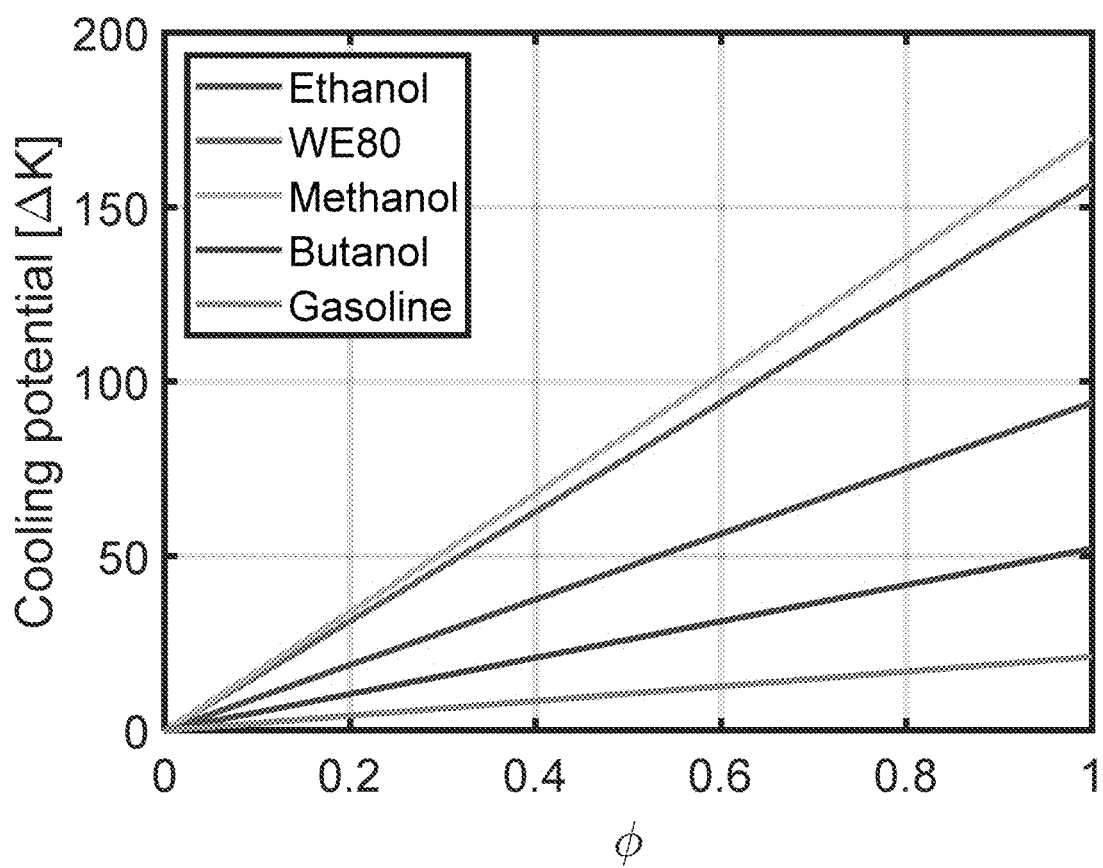
FIG. 2 is a graph of the cooling potential (units of ΔK) of ethanol, WE80 (80% ethanol 20% water by mass), methanol, butanol, and gasoline as a function of equivalence ratio assuming all of the heat needed to evaporate the fuel change comes from the air.

The latent heat of vaporization of neat ethanol and water is 0.85 J/mg and 2.26 J/mg, respectively. With a blend of 80% ethanol and 20% water by mass (WE80), the effective latent heat of vaporization of wet ethanol is 1.13 J/mg, slightly higher than methanol (1.1 J/mg), twice as large as butanol (0.58 J/mg), and greater than 350% higher than gasoline (0.31 J/mg for gasoline). FIG. 2 shows the cooling potential of ethanol, WE80, methanol, butanol, and gasoline as a function of equivalence ratio. Here, cooling potential is defined as the change in air temperature resulting from complete evaporation of the fuel in the air. The amount of fuel injected into the cylinder will affect how much cooling potential is available. Therefore, in FIG. 2, the cooling potential is both a function of the latent heat of vaporization of the fuel and the stoichiometric air fuel ratio (AFR). Note, the stoichiometric AFR of neat ethanol is 9.0026 and the stoichiometric AFR of WE80 is 7.202. Table 3 tabulates the fuel properties for the fuels used in FIG. 2. FIG. 2 shows that WE80 and methanol have the highest cooling potentials. The cooling potential is calculated by the following equation:

$$\text{Cooling Potential} = \frac{\Phi * AFR_{stoich} * h_{fg,fuel}}{C_{p,air}}$$

Where hfg, fuel is the latent heat of vaporization of fuel, Φ is the equivalence ratio, AFRstoich is the stoichiometric air-fuel ratio, and Cp, air is the specific heat of air. WE80 is available as a domestically produced biofuel and leaving the water content in the ethanol allows some energy and cost savings during production. WE80 also has a slightly higher lower heating value than methanol (21.4 MJ/kg vs. 19.9 MJ/kg). In the following experiments, WE80 was used with an equivalence ratio of 0.4. This means there is 63K of cooling potential available with WE80, 750% greater than gasoline's cooling potential of 8.4K. However, not all of the available cooling potential can be used to cool the air. Wall wetting will result in heat from the liner and/or piston crown being used to evaporate the fuel. Controlling the fraction of available cooling potential that is used can therefore control the intake temperature on a cycle-to-cycle basis. With 63K of cooling potential, there is the potential for cycle-to-cycle control of a large range of intake temperature.

TABLE 3

Fuel properties, including molecular formula, stoichiometric air-fuel ratio (AFRstoich), and latent heat of vaporization ($h_{fg}$) under STP conditions

| Fuel | Molecular Formula | AFR$_{stoich}$ | h$_{fg}$ [kJ/kg] |
|---|---|---|---|
| Ethanol | C$_2$H$_5$OH | 9.0026 | 850 |
| Methanol | CH$_3$OH | 6.47 | 1100 |
| Butanol | C4H9OH | 11.2 | 580 |
| Gasoline | — | 14.7 | 310 |
| Water | H$_2$O | — | 2260 |

Injection Timing Sweep

To control the fraction of fuel that evaporates in the air vs. on the wall, the amount of fuel that wets the walls must be controlled. With such a high heat of vaporization, the spray penetration length during the intake stroke (low in-cylinder temperature/pressure) will be very large. The location of the piston during injection can therefore control the length a spray can travel before hitting the walls. With this in mind, an injection timing sweep was performed with two different injectors and two different wall temperatures. The effect that injector included angle and wall temperature have on the range of intake temperature control was examined as discussed below. The two injector included spray angles used in this study were 60° and 150°. Although the wall temperature was not measured directly, changing the coolant and oil temperature were used to change the wall temperature. The two coolant/oil temperatures used in this study are 368K/358K (95° C./85° C.) and 353K/343K (80° C./70° C.).

To determine the effective range of intake temperature control, the injection timing sweeps were performed with a constant fueling rate of WE80 (18.75±0.50 mg/cycle) and a constant CA50 (7.0±0.5 deg aTDC). The upstream intake temperature was adjusted at each injection timing to control combustion phasing at the desired CA50. Notably, although the intake temperature varied largely, the amount of air flowing into the cylinder each cycle did not vary appreciably. This was because the charge is cooled by fuel evaporation (i.e., the fuel's cooling potential), resulted in the same temperature at IVC and therefore the same combustion phasing. The air flowrate did not decrease due to a decrease in air density as intake temperature increased because IVC temperature actually remained constant, and therefore, the equivalence ratio also remained constant (0.4±0.02).

The two injector included spray angles used in this study, 150° and 60°, are vastly different, targeting different parts of the combustion chamber. The 150° injector is typically used in CDC, where fuel is injected near TDC into a deep-bowled piston, creating a diffusion flame. When this injector is used to deliver fuel during the intake stroke and into a cylinder whose piston geometry is a wide, shallow bowl, the spray plumes tend to impinge on the liner and the available spray penetration length is always approximately half of the cylinder bore. Only near TDC do the edges of the piston bowl intercept the spray. This means that once the edge of the bowl moves down past the spray plumes, the ability to extend the spray length by injecting later is lost. This contrasts the 60° injector, whose available spray penetration length increases as the piston recedes to BDC until about −240 deg aTDC, where the spray will begin to impinge on the liner. The maximum available spray penetration length for the 60° injector occurs at −240 deg aTDC and is 2 times the cylinder bore. As a result, the injection timing sweep for the 150° injector was only carried out to −300 deg aTDC. Another reason for this was that the combustion efficiency became excessively low (<80%) and combustion became unstable after −300 deg aTDC due to excessive wall impingement and poor evaporation.

Intake Temperature

Figure 3:
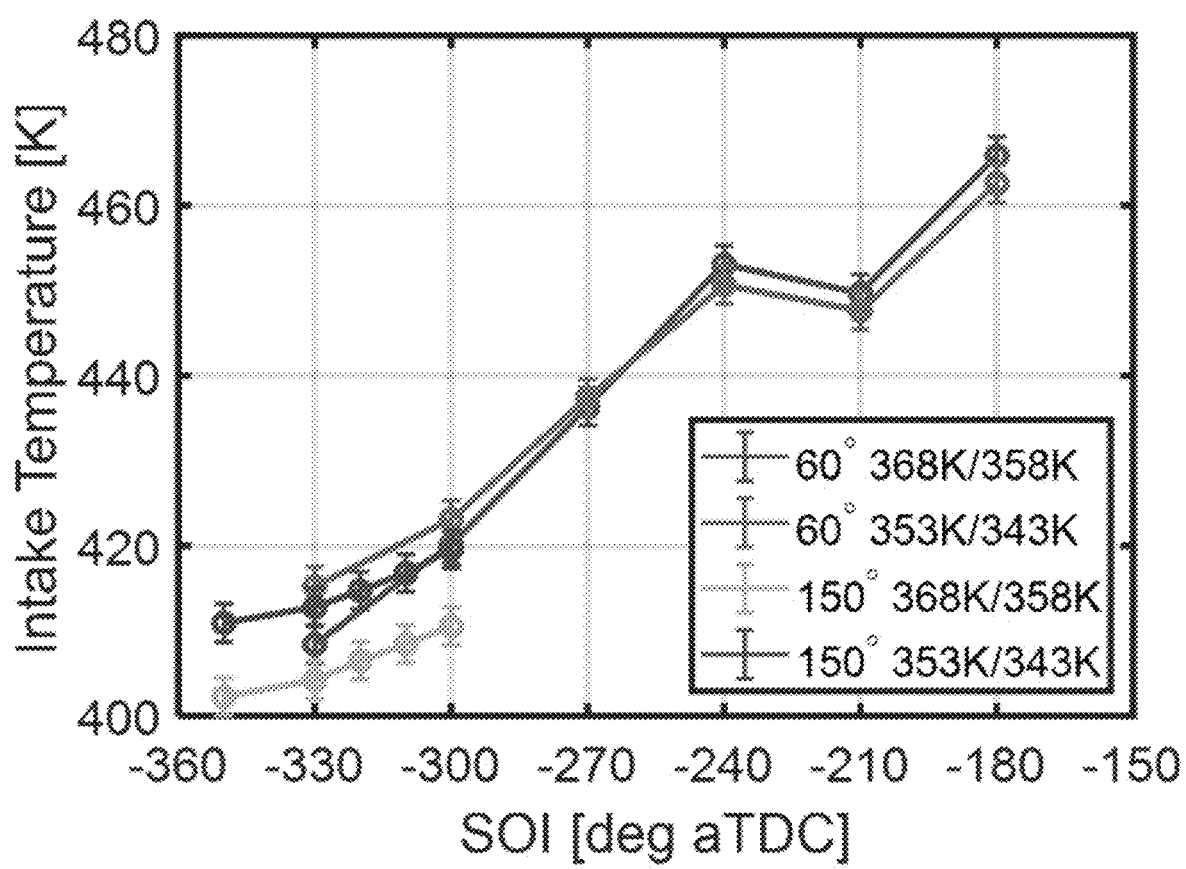
FIG. 3 is a graph of the intake temperature required to maintain a CA50 of 7.0 deg aTDC vs. injection timing for two coolant/oil temperatures (368K/358K and 353K/343K) with two different injector included spray angles (60° and 150°), with error bars showing the expanded uncertainty with a confidence interval of 95%.

FIG. 3 shows the intake temperature required to achieve a CA50 of 7.0±0.5 deg aTDC vs. injection timing for both coolant/oil temperatures with both spray angles. Due to the limitation on spray penetration length imposed by the 150° injector, the range of control over the intake temperature was limited, as seen in FIG. 3. On the other hand, the 60° injector's range of control over the intake temperature was very large. The range of intake temperature control of the 150° injector was 9.7K and 8.3K for the high and low coolant/oil temperatures, respectively. The range of intake temperature control of the 60° injector was 57.5K and 47.3K for the high and low coolant/oil temperatures, respectively. The results show that with the 60° injector, cycle-to-cycle control of combustion phasing for advanced combustion strategies using wet ethanol as a fuel can be achieved.

It was expected that the required intake temperature would increase with retarding injection timings. This trend was seen for the entire limited injection timing sweep with the 150° and up until an injection timing of −240 deg aTDC with the 60° injector. The required intake temperature of −210 deg aTDC was actually lower than that of −240 deg aTDC. The required intake temperature of −180 deg aTDC was then higher than both −210 deg aTDC and −240 deg aTDC.

Combustion Efficiency and Emissions

Figure 4:
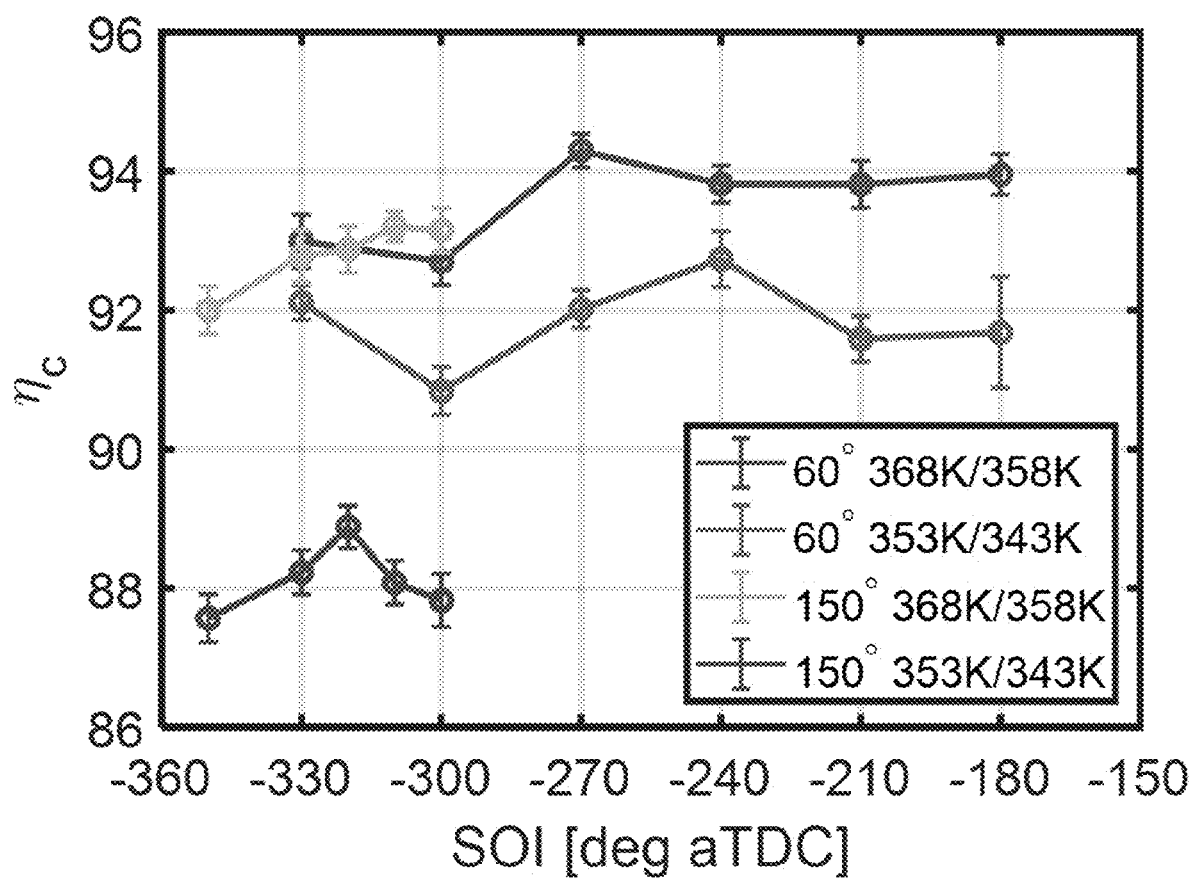
FIG. 4 is a graph of combustion efficiency (Tic) vs. injection timing for two coolant/oil temperatures (368K/358K and 353K/343K) with two different injector included spray angles (60° and 150°), with error bars showing the expanded uncertainty with a confidence interval of 95%.

FIG. 4 shows the combustion efficiency ($\eta_c$) vs. injection timing for both coolant/oil temperatures with both injector included spray angles. The combustion efficiency of both injectors increased when the coolant/oil temperature was increased. However, the increase in combustion efficiency due to the increase in coolant/oil temperature was not the same for both injectors. At a coolant/oil temperature of 353K/343K, the 150° injector had a low combustion efficiency at each injection timing. As previously mentioned, the combustion efficiency was extremely low at −270 deg aTDC, combustion became unstable, and the injection timing sweep was truncated. Contrarily, the 60° injector tended to wet the piston crown, which lacked direct cooling and was therefore less sensitive than the liner to changes in coolant/oil temperature. As a result, the combustion efficiency of the 60° injector was higher than that of the 150° injector when the coolant/oil temperature was 353K/343K for similar injection timings. The combustion efficiency of the 60° injector increased less than the 150° injector when the coolant/oil temperature was raised to 368K/358K, resulting in similar combustion efficiencies among the two injectors for similar injection timings.

Figure 5:
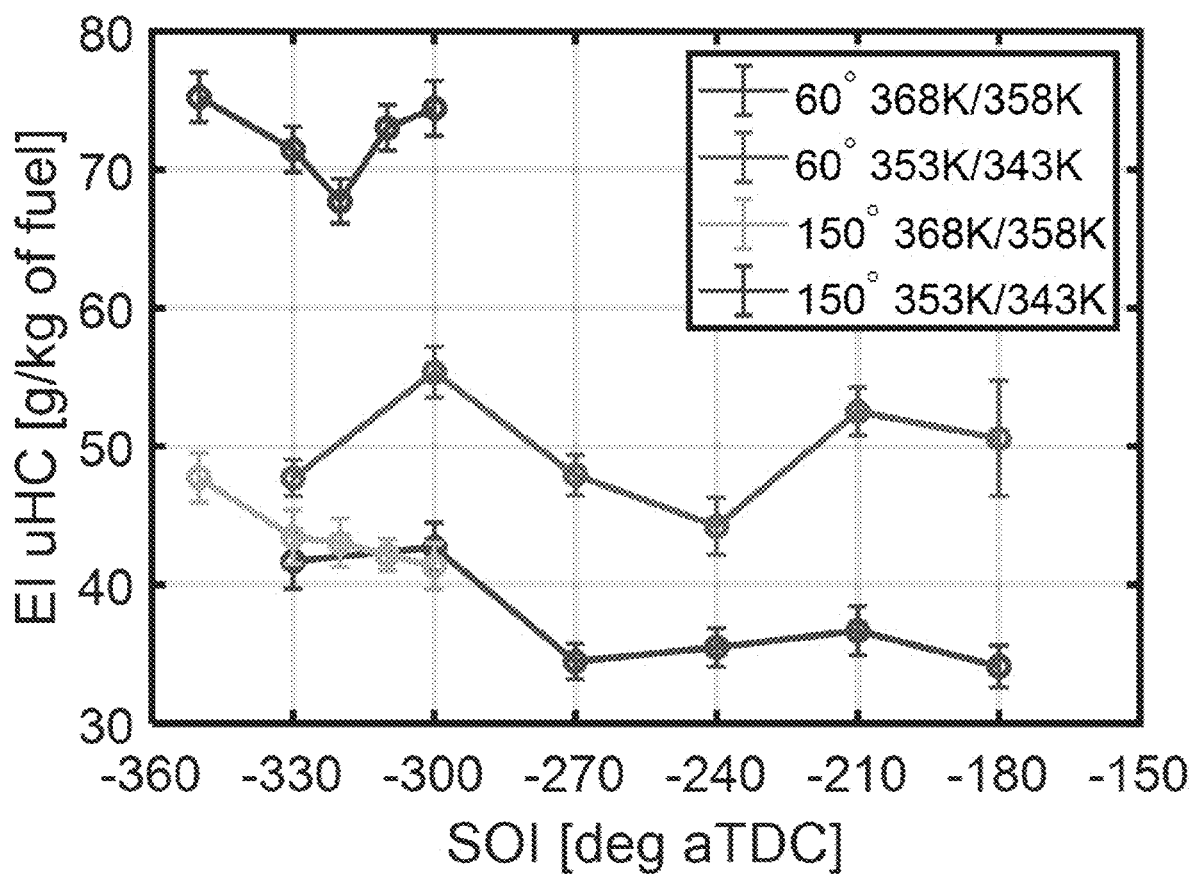
FIG. 5 is a graph of emission index (EI) of unburned hydrocarbons (uHC) vs. injection timing for two coolant/oil temperatures (368K/358K and 353K/343K) with two different injector included spray angles (60° and 150°), with error bars showing the expanded uncertainty with a confidence interval of 95%.
Figure 6:
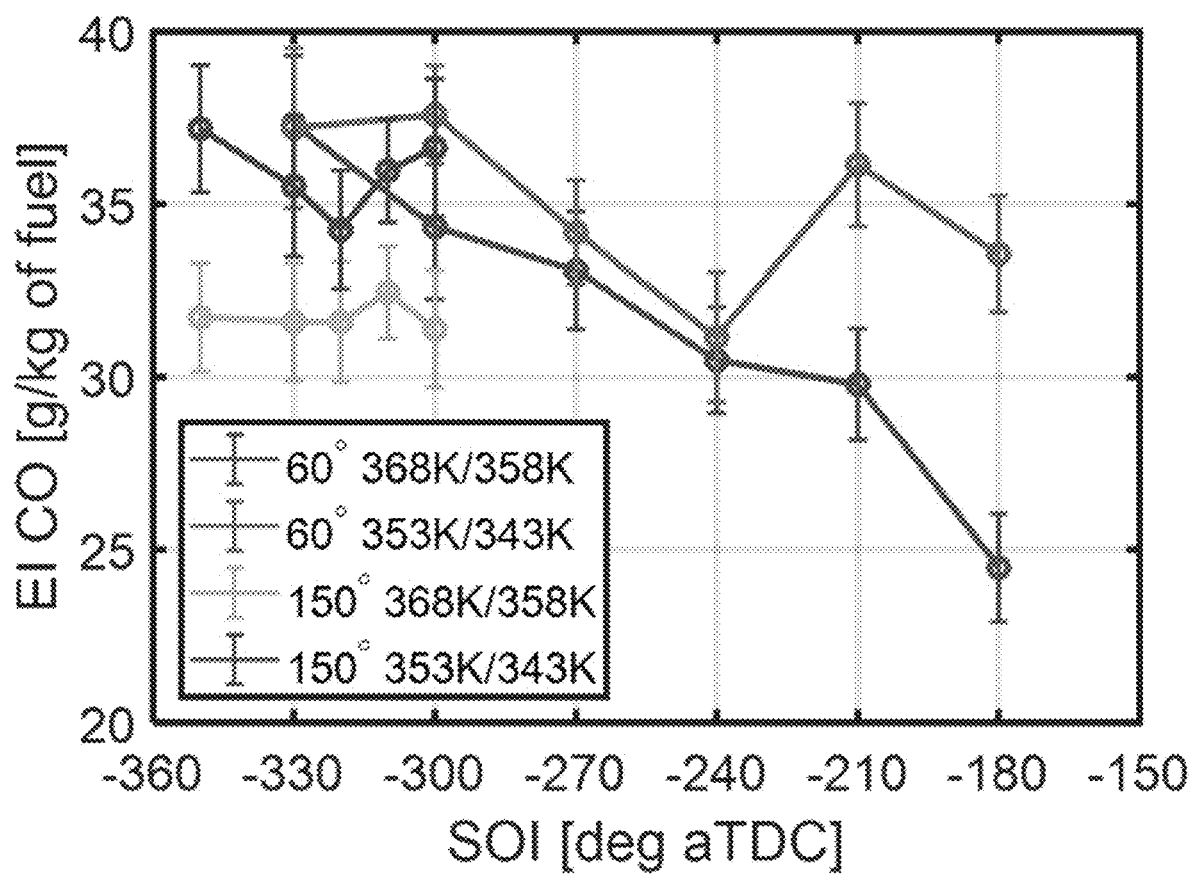
FIG. 6 is a graph of emission index (EI) of CO vs. injection timing for two coolant/oil temperatures (368K/358K and 353K/343K) with two different injector included spray angles (60° and 150°), with error bars showing the expanded uncertainty with a confidence interval of 95%.

The emissions index (EI) of unburned hydrocarbons (uHC), and EI CO vs. injection timing for both coolant/oil temperatures with both spray angles are shown in FIG. 5 and FIG. 6, respectively. The engine-out uHC emissions in these experiments followed the reverse of the trend outlined by the combustion efficiency. On the other hand, the CO emissions, specifically for both injectors with the coolant/oil temperatures of 368K/358K, did not directly follow the reverse of the trend outlined by the combustion efficiency. For both injectors, the CO emissions were lower with the higher coolant/oil temperatures. For the 150° injector, the CO emissions remained nearly constant even though the combustion efficiency is decreasing. For the 60° injector, the CO emissions decreased with retarding injection timing. While not being bound to any theory, it is believed that as the CO emissions are related to the fraction of fuel that evaporates off the walls, since that will result in colder walls with rich regions nearby, that might inhibit complete combustion.

Burn Duration

Figure 7:
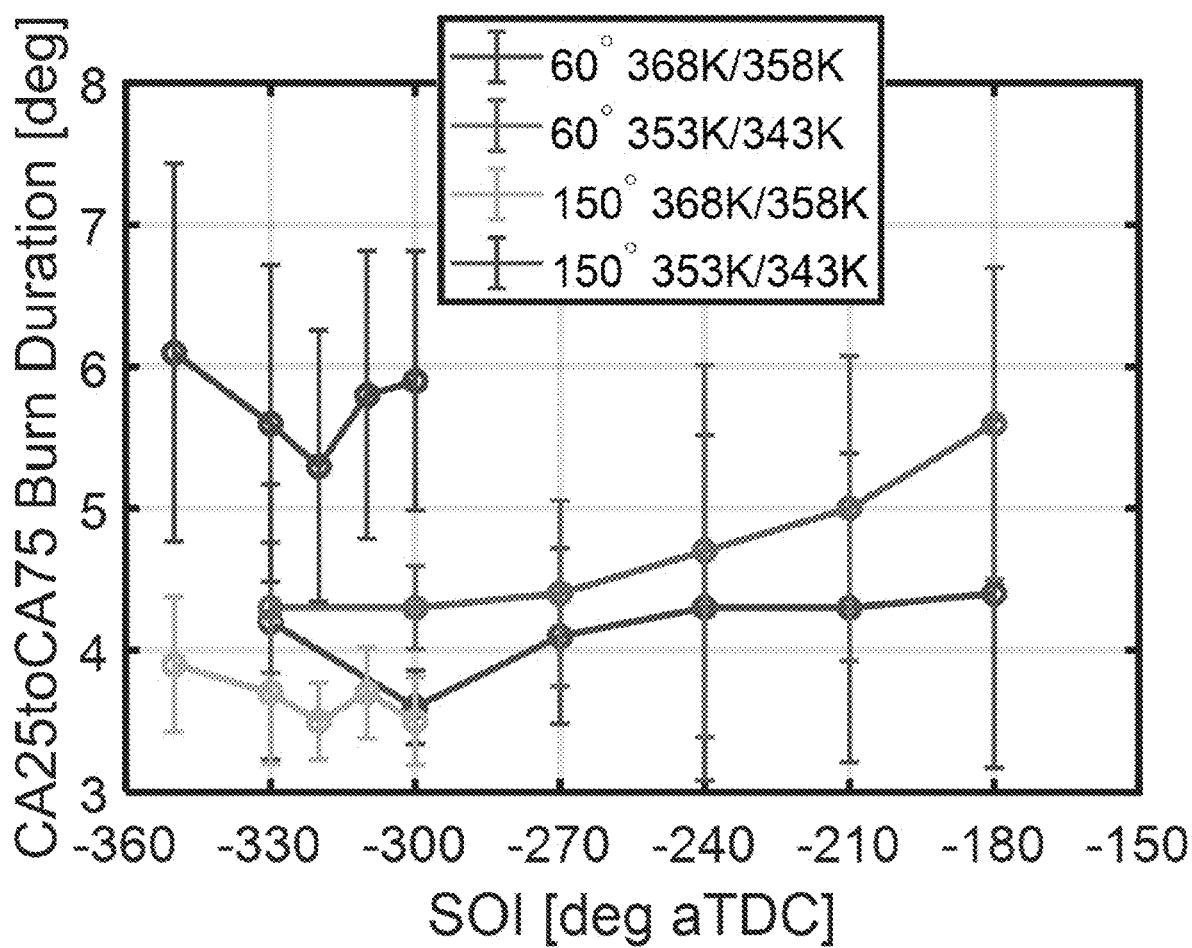
FIG. 7 is a graph of CA25 to CA75 burn duration vs. injection timing for two coolant/oil temperatures (368K/358K and 353K/343K) with two different injector included spray angles (60° and 150°), with error bars showing the expanded uncertainty with a confidence interval of 95%.

FIG. 7 shows the CA25 to CA75 burn duration vs. injection timing for both coolant/oil temperatures with both spray angles. The difference in the amount of thermal stratification resulting from a change in wall temperature of ~15K is negligible. Therefore, no significant change in burn duration caused by a change in thermal stratification was expected due to a change in coolant/oil temperature. For a given injection timing with the 60° injector, the burn duration was not highly sensitive to the coolant/oil temperature, with the difference in burn duration for the two coolant/oil temperatures falling within the bounds of uncertainty. However, with the 150° injector, the burn duration was longer with the lower coolant/oil temperature for a given injection timing. The resulting low combustion efficiencies are coupled with the longer burn duration.

The length of the error bars in FIG. 7 provide guidance into the cyclic variability (cycle-to-cycle combustion variation) of the operating condition. The variability in the burn duration of the 150° injector was larger with the lower coolant/oil temperatures due to worsening evaporation conditions and poor combustion efficiency. On the other hand, the variability in the burn duration of the 60° injector was not significantly affected by the coolant/oil temperature. However, the cyclic variability in the burn duration did increase as the injection timing is retarded. Furthermore, it can be seen from FIG. 7 that the burn duration begins to trend upward as injection timing is retarded. This was seen at injection timings as early as −140 deg aTDC [21] and would not be surprising if it occurred as early as −240 deg aTDC.

CONCLUSIONS

Fuels with a high latent heat of vaporization have a large charge cooling potential. By adjusting the intake stroke injection timing of a direct injected fuel with a high latent heat of vaporization, the fraction of fuel that evaporates in the air vs. the fraction of fuel that wets and evaporates off of the walls are controllable, providing a means to control the temperature at intake valve closing, and thus the combustion phasing, on a cycle-to-cycle basis, which is something advanced combustion concepts have a great need for.

In this study, a mixture of 80% ethanol and 20% water by mass was used as the high latent heat of vaporization fuel. The experiments were conducted on a single cylinder, Ricardo Hydra engine block that mimics the geometry of a 1.7 L GM/Isuzu diesel engine. Intake stroke injection timing sweeps of direct-injected HCCI combustion were performed, adjusting the intake air temperature to match combustion phasing at 7.0 deg aTDC. These injection timing sweeps were performed with two different coolant/oil temperatures (368K/358K and 353K/343K) with two different injector spray angles (60° and 150°).

The results show that through a range of injection timings from −330 deg aTDC to −180 deg aTDC, the fraction of fuel evaporating in the air ranges from 0.22 to 0.82. Advanced combustion concepts, like HCCI, TSCI and RCCI, have a significant need for high-speed control of combustion phasing. The large range of intake temperature control found in this study provides a means to achieve this high controllability of the combustion phasing of an advanced, low temperature combustion concept, on a cycle-to-cycle basis.

Advantages of the method disclosed herein include: similar efficiency levels to slightly more efficient than diesel engines (used for heavy duty application, on-highway trucking, and construction); significantly cleaner emissions characteristics than diesel engines; significantly cheaper than diesel engines; significantly better control and a larger operating range than other advanced combustion strategies; can use current production engine hardware without requiring any change to the engine architecture; can use a domestically mass-produced biofuel and saves energy during the production of the biofuel

Abbreviations deg aTDC degrees after Top Dead Center
CAx Crank angle location when x % of the fuel has burned. (e.g. CA50)
CAD Crank angle degrees
CDC Conventional diesel combustion
CFD Computational fluid dynamics
CO Carbon monoxide
$CO_2$ Carbon dioxide
CoV Coefficient of variance
DI Direct injection
DWI Direct water injection
EGR Exhaust gas recirculation
EI Emissions index
EVC Exhaust valve closing
EVO Exhaust valve opening
GHRR Gross heat release rate
HCCI Homogeneous charge compression ignition
$IMEP_g$ Gross indicated mean effective pressure
IVC Intake valve closing
IVO Intake valve opening
LTC Low temperature combustion
MPRR Maximum pressure rise rate
$NO_x$ Oxides of Nitrogen (NO or $NO_2$)
NVO Negative valve overlap
$\eta_{ig,th}$ Gross thermal efficiency
$\eta_{comb}$ Combustion efficiency
$O_2$ Diatomic oxygen
PCCI (diesel) Premixed charge compression ignition
PFI Port fuel injection
PFS Partial fuel stratification
PM Particulate matter
PLIF Planar laser-induced fluorescence
P-V Pressure-volume
diagram diagram
RCCI Reactivity controlled compression ignition
SACI spark assisted compression
SF Split fraction
SI Spark ignition
SOC Start of combustion
SOI Start of Injection
TSA Thermal stratification analysis
TSCI Thermally stratified compression ignition
uHC Unburned hydrocarbons
WE Wet ethanol
WI Water injection
VCR Variable compression ratio
γ Ratio of specific heats While the invention has been shown and described with reference to certain embodiments of the present invention thereof, it will be understood by those skilled in the art that various changes in from and details may be made therein without departing from the spirit and scope of the present invention and equivalents thereof.

What is claimed is:

1. A method for controlling compression ignition combustion phasing in an internal combustion engine comprising:
   providing a high heat of vaporization fuel charge, the fuel charge having a latent heat of vaporization of between about 600 to about 1800 kJ/kg; and
   directly injecting a spray of the high heat of vaporization fuel charge into a cylinder of an internal combustion engine during the intake stroke, the internal combustion engine having a gas exchange stage and a combustion stage, the injecting from a single injector and occurring at least immediately after Top Dead Center (TDC) during the gas exchange stage.

2. The method of claim 1 wherein the fuel charge has a latent heat of vaporization of between about 900 to about 1500 kJ/kg.

3. The method of claim 2 wherein the fuel charge has a latent heat of vaporization of between about 1000 to about 1200 kJ/kg.

4. The method of claim 3 wherein the fuel charge has a latent heat of vaporization of between about 1100 to about 1150 kJ/kg.

5. The method of claim 1 wherein the fuel charge comprises a mixture of water and one or more alcohols.

6. The method of claim 5 wherein the mixture comprises about 5% to about 40% water; and about 95% to about 60% alcohol, by mass.

7. The method of claim 5 wherein the one or more alcohols are selected from the group of $C_1$-$C_6$ alkanols and combinations thereof.

8. The method of claim 7 wherein the fuel charge comprises a mixture of water and ethanol.

9. The method of claim 8 wherein the fuel charge comprises about 80% ethanol and about 20% water, by mass.

10. The method of claim 1 wherein the single injector has an injector included angle of between about 150° to about 30°.

11. The method of claim 10 wherein the injector included angle is between about 118° to about 60°.

12. The method of claim 1 wherein the direct injecting occurs from between about at least immediately after TDC during the gas exchange stage to about −330 degrees after TDC during the combustion stage.

13. The method of claim 12 wherein the direct injecting occurs from between about −330 degrees after TDC during the combustion stage to about −240 degrees after TDC during the combustion stage.

14. The method of claim 1 wherein the step of directly injecting a spray comprises multiple spray injections.

15. A method for operating a compression ignition internal combustion engine comprising:
directly injecting a first portion of a high heat of vaporization fuel charge into a cylinder of an internal combustion engine during the intake stroke, the internal combustion engine having a gas exchange stage and a combustion stage, the injecting from a single injector and occurring at least immediately after Top Dead Center (TDC) during the gas exchange stage; and
directly injecting a second portion of the high heat of vaporization fuel charge into the cylinder during the compression stroke, the fuel charge having a latent heat of vaporization of between about 600 to about 1800 kJ/kg.

16. The method of claim 15 wherein the fuel charge has a latent heat of vaporization of between about 900 to about 1500 kJ/kg.

17. The method of claim 16 wherein the fuel charge has a latent heat of vaporization of between about 1000 to about 1200 kJ/kg.

18. The method of claim 17 wherein the fuel charge has a latent heat of vaporization of between about 1100 to about 1150 kJ/kg.

19. The method of claim 15 wherein the fuel charge comprises a mixture of water and one or more alcohols.

20. The method of claim 19 wherein the mixture comprises about 5% to about 40% water; and about 95% to about 60% alcohol, by mass.

21. The method of claim 19 wherein the one or more alcohols are selected from the group of $C_1$-$C_6$ alkanols and combinations thereof.

22. The method of claim 19 wherein the fuel charge comprises a mixture of water and ethanol.

23. The method of claim 22 wherein the fuel charge comprises about 80% ethanol and about 20% water, by mass.

24. The method of claim 15 wherein the first portion comprises between about 70% to about 90%, by mass, of the fuel charge; and the second portion comprises between about 10% to about 30%, by mass, of the fuel charge.

25. The method of claim 15 wherein the step of directly injecting the first portion comprises multiple spray injections during the intake stroke.

26. The method of claim 15 wherein the step of directly injecting the second portion comprises multiple spray injections during the compression stroke.

27. A method of compression ignition in an internal combustion engine comprising:
providing a high heat of vaporization fuel charge, the fuel charge having a latent heat of vaporization of between about 600 to about 1800 kJ/kg; and
directly injecting a spray of the high heat of vaporization fuel charge from a single injector into a cylinder of an internal combustion engine during the intake stroke, the internal combustion engine having a gas exchange stage and a combustion stage, the injecting comprising multiple injections wherein a fraction of each injection evaporates in the air of the cylinder, the injections occurring between about −350 degrees after Top Dead Center (TDC) during combustion stage to about −180 degrees after TDC during the combustion stage, wherein the fraction that evaporates in the air of the cylinder is between about 20% to about 95%.

28. A method of controlling the rate of combustion in an advanced compression ignition combustion process of an internal combustion engine comprising:
providing a high heat of vaporization fuel charge, the fuel charge having a latent heat of vaporization of between about 600 to about 1800 kJ/kg; and
directly injecting a spray of the high heat of vaporization fuel charge into a cylinder of an internal combustion engine during the compression stroke, the internal combustion engine having a gas exchange stage and a combustion stage, the injecting from a single injector and occurring between about −140 degrees after Top Dead Center (TDC) during combustion stage to about −30 degrees after TDC during the combustion stage.

* * * * *